(12) United States Patent
Oami

(10) Patent No.: US 10,121,089 B2
(45) Date of Patent: Nov. 6, 2018

(54) OBJECT INFORMATION EXTRACTION APPARATUS, OBJECT INFORMATION EXTRACTION PROGRAM, AND OBJECT INFORMATION EXTRACTION METHOD

(71) Applicant: NEC Corporation, Minato-ku, Tokyo (JP)

(72) Inventor: Ryoma Oami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 190 days.

(21) Appl. No.: 14/430,254

(22) PCT Filed: Mar. 27, 2013

(86) PCT No.: PCT/JP2013/002069
§ 371 (c)(1),
(2) Date: Mar. 23, 2015

(87) PCT Pub. No.: WO2014/045479
PCT Pub. Date: Mar. 27, 2014

(65) Prior Publication Data
US 2015/0227806 A1     Aug. 13, 2015

(30) Foreign Application Priority Data
Sep. 24, 2012  (JP) ................ 2012-209111

(51) Int. Cl.
| | | |
|---|---|---|
| *G06K 9/46* | (2006.01) | |
| *G06K 9/00* | (2006.01) | |
| *G06K 9/52* | (2006.01) | |

(52) U.S. Cl.
CPC ....... *G06K 9/4604* (2013.01); *G06K 9/00221* (2013.01); *G06K 9/00785* (2013.01); *G06K 9/522* (2013.01)

(58) Field of Classification Search
CPC .......... G06K 9/00221; G06K 9/00785; G06K 9/4604; G06K 9/522; G06T 7/20
See application file for complete search history.

(56) References Cited

U.S. PATENT DOCUMENTS

| | | | |
|---|---|---|---|
| 2012/0176505 A1* | 7/2012 | Kim ................... | H04N 5/23219 348/222.1 |
| 2013/0187897 A1* | 7/2013 | Liu ...................... | G09G 3/3648 345/204 |
| 2014/0253737 A1* | 9/2014 | Kempinski .............. | G06T 7/20 348/169 |

FOREIGN PATENT DOCUMENTS

| | | |
|---|---|---|
| JP | H07-200824 A | 8/1995 |
| JP | H10-320563 A | 12/1998 |

(Continued)

OTHER PUBLICATIONS

International Search Report for PCT Application No. PCT/JP2013/002069, dated Jun. 4, 2013.

*Primary Examiner* — Antoinette Spinks

(57) ABSTRACT

An object information extraction apparatus (2000) includes an image acquisition unit (2020), a frequency determination unit (2040), and an information extraction unit (2060). The image acquisition unit (2020) acquires a plurality of images corresponding to a predetermined unit time of a video. The frequency determination unit (2040) generates frequency information for each of a plurality of partial areas included in each of a plurality of images. The information extraction unit (2060) extracts information of an object included in each partial area from each image corresponding to the number indicated by the frequency information for each partial region among a plurality of images corresponding to a predetermined unit time for each partial area.

10 Claims, 10 Drawing Sheets

(56) References Cited

FOREIGN PATENT DOCUMENTS

| | | | |
|---|---|---|---|
| JP | 2006-139418 | A | 6/2006 |
| JP | 2007-249386 | A | 9/2007 |
| JP | 2007-274299 | A | 10/2007 |

* cited by examiner

| PARTIAL AREA ID | FREQUENCY |
|---|---|
| 1 | 5 IMAGES/SECOND |
| 2 | 3 IMAGES/SECOND |
| ⋮ | ⋮ |

OBJECT INFORMATION EXTRACTION APPARATUS, OBJECT INFORMATION EXTRACTION PROGRAM, AND OBJECT INFORMATION EXTRACTION METHOD

This application is a National Stage Entry of PCT/JP2013/002069 filed on Mar. 27, 2013, which claims priority from Japanese Patent Application 2012-209111 filed on Sep. 24, 2012, the contents of all of which are incorporated herein by reference, in their entirety.

TECHNICAL FIELD

The present invention relates to an object information extraction apparatus, an object information extraction program, and an object information extraction method.

BACKGROUND ART

An apparatus extracting information of an object such as a person or a car imaged by a monitoring camera or the like (hereinafter referred to as object information) has been developed. Here, the object refers to an object such as a person, a car, or an animal. Further, the object information is information indicating a position or a shape of the object or information indicating a feature-value of the object. The feature-value of the object is a value indicating a feature such as a face, clothing or the like of a person or a value indicating a feature such as a shape or a color of a car.

An apparatus described in Patent Document 1 detects a change in a viewing direction of a camera using a gyro sensor or a gravity sensor, and changes a frequency of extraction of a feature-value of an image based on the change in the viewing direction of the camera.

An apparatus described in Patent Document 2 extracts a feature-value of a photographing target from an image. The apparatus divides an image into a plurality of areas, and estimates a probability of appearance of a photographing object in each divided area. Also, the apparatus extracts a feature-value of each area after changing a method of representing an image for each area based on the estimated probability.

RELATED DOCUMENT

Patent Document

[Patent Document 1] Japanese Unexamined Patent Application Publication No. 07-200824
[Patent Document 2] Japanese Unexamined Patent Application Publication No. 2006-139418

DISCLOSURE OF THE INVENTION

The present inventor has found a necessity of an object information extraction apparatus capable of reliably acquiring necessary object information. An existing apparatus represented by the apparatus described in Patent Document 1 and the apparatus described in Patent Document 2 uniformly performs the object detection process on an image, and extracts each feature-value from each detected object. However, for each object in the image, ease of extraction of the object information is not equal. Suppose that a monitoring camera performing photography from a ceiling at an angle obliquely overlooking an area captures a video. In this case, a lower portion of an image included in the video is the front side in an actual space, and an upper portion of the image is the backside in the actual space. Therefore, in the lower portion of the image indicating the front side, the object is larger than that in the upper portion of the image indicating the back side. Further, in the lower portion of the image indicating the front side, an amount of motion of the object is larger than that in the upper portion of the image indicating the back side.

In the case of the above-described example, larger the object is imaged, more suitable the object is for extraction of the object information since the object information extraction apparatus can extract more information. For example, various pieces of information such as a shape of eyes or a nose can be accurately extracted from a largely imaged face. Therefore, an object imaged in a lower portion of an image is suitable for extraction of the object information. However, the object imaged in the lower portion is imaged in the smaller number of images since an amount of motion of the object is large. Therefore, an existing object information extraction apparatus, which extracts object information from the object in the image, extracts at a lower frequency the object information from the object in the lower portion of the image that is inherently suitable for extraction of the object information.

On the other hand, the object imaged in an upper portion of the image is not suitable for extraction of the object information. For example, since a face of a person imaged in the upper portion of the image is small in the image, it is difficult to extract information of details of the face. However, the object imaged in the upper portion is imaged in a lot of images since an amount of motion of the object is small. Therefore, the existing object information extraction apparatus frequently extracts the object information from the object moving in the upper portion of the image that is not inherently suitable for extraction of the object information.

When a large number of objects are imaged in a screen, adverse effects of uniformly performing extraction of the object information from an imaged object as described above become remarkable. In this case, since an existing object information extraction apparatus extracts the object information from a large number of objects imaged in the image, a process of extracting the object information takes a lot of time. Therefore, when the object information is extracted from a plurality of image frames included a video, the number of image frames from which the object information can be extracted decreases. As a result, an opportunity to extract the object information from an object suitable for feature-value extraction due to being largely imaged in the image is reduced, and necessary object information cannot be reliably acquired.

An object of the present invention is to provide an object information extraction apparatus, an object information extraction program, and an object information extraction method with which necessary object information is reliably acquired.

An object information extraction apparatus provided in the present invention includes: an image acquisition unit that acquires a plurality of image frames corresponding to a predetermined unit time of a video; a frequency determination unit that acquires a plurality of pieces of different frequency information for a plurality of partial areas included in each of the image frames, the image frame being acquired by the image acquisition unit; and an information extraction unit that extracts object information from at least one of the plurality of partial areas by executing image processing for image frames corresponding to the number corresponding to the frequency information of the partial area among the plurality of image frames for each partial area, the frequency information being acquired by the frequency determination unit.

A program provided in the present invention causes a computer to function as an object information extraction apparatus. The program causes the computer to include: an image acquisition function of acquiring a plurality of image frames corresponding to a predetermined unit time of a video; a frequency determination function of acquiring a plurality of pieces of different frequency information for a plurality of partial areas included in each of the image frames, the image frame being acquired with the image acquisition function; and an information extraction function of extracting object information from at least one of the plurality of partial areas by executing image processing for image frames corresponding to the number corresponding to the frequency information of the partial area among the plurality of image frames for each partial area, the frequency information being acquired with the frequency determination function.

A method provided in the present invention causes a computer to function as an object information extraction apparatus. The method includes: an image acquisition step of acquiring, by the computer, a plurality of image frames corresponding to a predetermined unit time of a video; a frequency determination step of acquiring, by the computer, a plurality of pieces of different frequency information for a plurality of partial areas included in each of the image frames, the image frame being acquired in the image acquisition step; and an information extraction step of extracting, by the computer, object information from at least one of the plurality of partial areas by executing image processing for image frames corresponding to the number corresponding to the frequency information of the partial area among the plurality of image frames for each partial area, the frequency information being acquired in the frequency determination step.

According to the present invention, it is possible to provide an object information extraction apparatus, an object information extraction program, and an object information extraction method with which necessary object information is reliably acquired.

BRIEF DESCRIPTION OF THE DRAWINGS

The above-mentioned objects, other objects, features and advantages will be made clearer from the preferred Exemplary Embodiments described below, and the following accompanying drawings.

FIG. 4 is a diagram illustrating a configuration of a frequency table.

DESCRIPTION OF EXEMPLARY EMBODIMENTS

Figure 1:
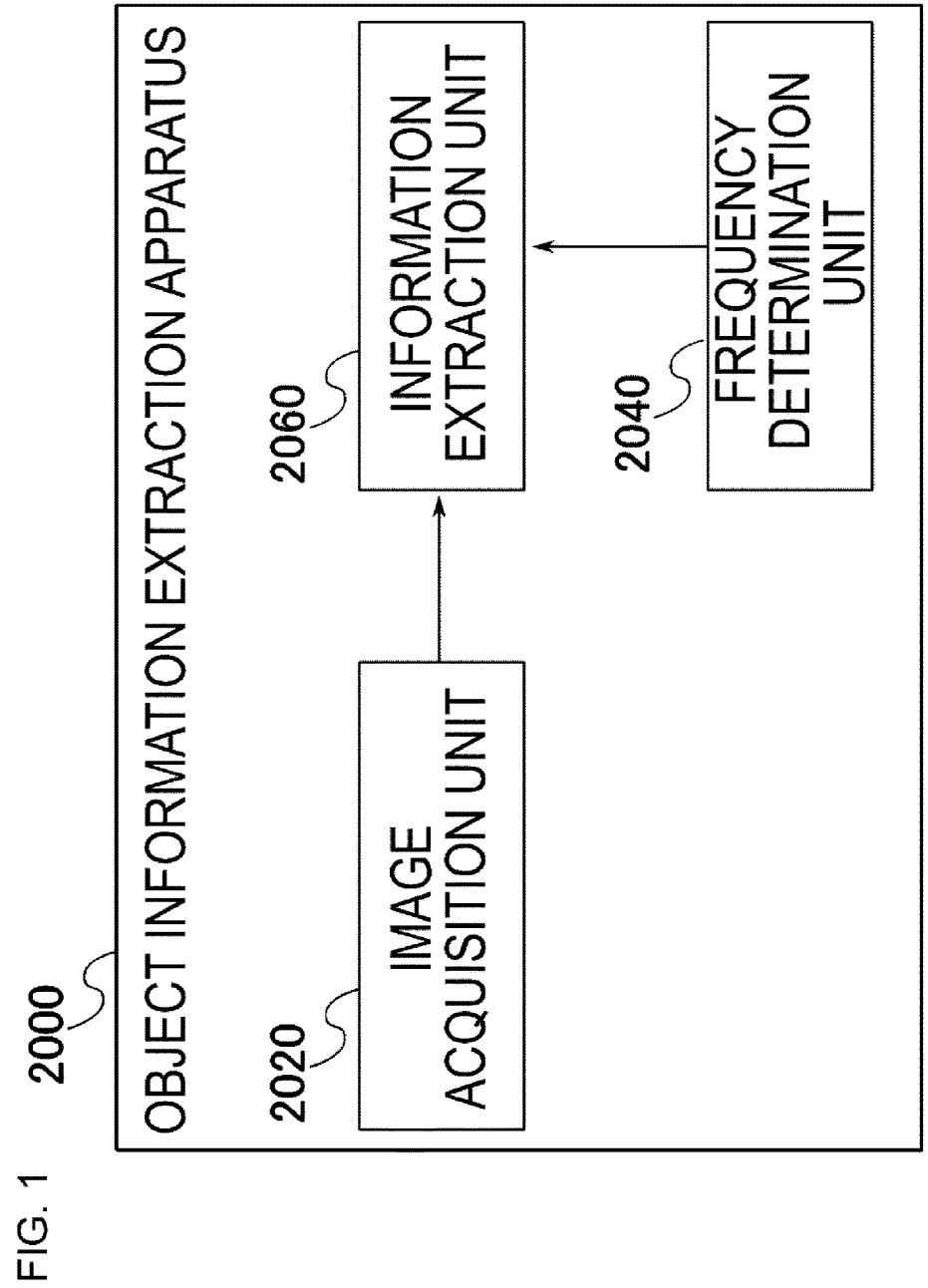
FIG. 1 is a block diagram illustrating an object information extraction apparatus according to Exemplary Embodiment 1.

Hereinafter, exemplary embodiments of the present invention will be described using the drawings. Further, in all the drawings, the same components are denoted with the same reference signs and description thereof will not be repeated.

Further, in the description below, each component of each apparatus indicates a block of a functional unit rather than a configuration of a hardware unit. Each component of each apparatus is implemented with an arbitrary combination of hardware and software mainly using a CPU, a memory, a program for implementing components shown in the drawings which is loaded to the memory, a storage medium such as a hard disk storing the program, and an interface for network connection, which may be of an arbitrary computer. Also, there are various modification examples in an implementation method and apparatus.

<Overview of Exemplary Embodiment>

FIG. 1 is a diagram illustrating an object information extraction apparatus 2000 including only functional blocks that are commonly included in respective exemplary embodiments. Here, arrows of FIG. 1 indicate a flow of information.

The object information extraction apparatus 2000 includes an image acquisition unit 2020, a frequency determination unit 2040, and an information extraction unit 2060. The image acquisition unit 2020 acquires a plurality of image frames in a predetermined unit time of a captured video. Hereinafter, an image frame is simply referred to as an image. Here, the predetermined unit time is one second, for example. Further, when a frame rate of the video is 15 fps, a plurality of image frames corresponding to the predetermined unit time are 15 consecutive image frames in the video, for example.

The frequency determination unit 2040 generates frequency information for each of a plurality of partial areas included in each of the plurality of images. Here, the partial area is each area obtained by dividing the image into one or more positions (hereinafter, divided area) or an individual area representing each object. A frequency indicated by the frequency information generated for each partial area is the number of images the partial area of which the information extraction unit 2060 performs image processing on, for the plurality of images in the predetermined unit time, for example. In this case, for example, the frequency information indicates a frequency as "X images/second." Further, the frequency indicated by the frequency information may indicate, for example, a period indicating an interval of images the partial area of which are processed by the information extraction unit 2060 performs image processing on the partial area, for a plurality of images in the predetermined unit time. In this case, for example, the frequency information indicates a frequency as "every X images." Hereinafter, the frequency information is the number of images the partial area of which the information extraction unit 2060 performs image processing on, among a plurality of images in the predetermined unit time.

For each partial area, the information extraction unit 2060 performs image processing on each partial area for each image corresponding to the number indicated by the frequency information for a plurality of images in the predetermined unit time, and extracts the object information of the object included in each partial area. For example, when the frequency information for a certain partial area indicates the frequency of "5 images/second" and the frame rate of the acquired video is 15 frames/second (fps), the information extraction unit 2060 extracts the object information from the partial area for 5 images among 15 images in the predetermined unit time.

Various objects such as a person, a car and an animal are processing targets of the object information extraction apparatus 2000.

There are various methods with which the image acquisition unit 2020 acquires a video. For example, the image acquisition unit 2020 acquires a video from a video camera, such as a monitoring camera. Further, for example, the image acquisition unit 2020 may acquire a video stored in a portable storage medium or may acquire a video stored in the outside through a communication line.

The image acquisition unit 2020 acquires various videos. For example, the image acquisition unit 2020 acquires a video captured by a video camera. Further, the image acquisition unit 2020 may acquire a video processed by another apparatus, for example. For example, the image acquisition unit 2020 acquires a compressed video. Also, the image acquisition unit 2020 acquires a video processed by an apparatus that performs image processing, such as a noise reduction, on the video from the apparatus. Thus, the object information extraction apparatus 2000 can be used in combination with another apparatus that performs image processing on a video.

A frequency determination method in the frequency determination unit 2040 differs according to a definition of the partial area. When the object information extraction apparatus 2000 uses the divided area as the partial area, the frequency determination unit 2040 generates frequency information for each divided area. The frequency determination unit 2040 determines the frequency for each divided area based on an index given to each divided area (hereinafter, divided area frequency index). The frequency determination unit 2040 acquires, for example, a divided area frequency index indicating a high frequency for a divided area in which the amount of motion of the object is predicted to be large. This is because there are often a smaller number of images in which an object with a larger motion amount is imaged, and thus, it is necessary to perform extraction of the object information at a high frequency so as to extract sufficient information from the object with a larger motion amount. Further, for example, the frequency determination unit 2040 acquires a divided area frequency index indicating a high frequency for a divided area in which the object is predicted to be larger. This is because an amount of information being able to be obtained, such as detailed information of each portion of the object, is larger as the imaged object becomes larger, and thus, it is necessary to perform extraction of the object information at a high frequency. A user of the object information extraction apparatus 2000 may manually give the divided area frequency index, or the divided area frequency index may be stored in an external apparatus such as a server and automatically acquired from the external apparatus by the frequency determination unit 2040.

On the other hand, when the object information extraction apparatus 2000 uses an individual area indicating an object as the partial area, the frequency determination unit 2040 generates frequency information for each object. The frequency determination unit 2040 acquires an amount of motion of each object and generates frequency information of each object based on the acquired amount of motion of each object. In this case, the frequency determination unit 2040 generates frequency information indicating a high frequency for an object in which the amount of motion is large. Further, for example, the frequency determination unit 2040 acquires the size of each object, and generates the frequency information for each object based on the acquired size of the object. In this case, the frequency determination unit 2040 generates frequency information indicating a high frequency for a large object.

There are various pieces of object information extracted by the information extraction unit 2060. For example, the information extraction unit 2060 extracts information on a position or a shape of the object. Further, the information extraction unit 2060 extracts a feature-value indicating a feature of the object. For example, the information extraction unit 2060 extracts a feature-value of a face of a person imaged in the image. Thus, the user of the object information extraction apparatus 2000 can determine, for example, whether or not a specific person is imaged in the video. Similarly, as a feature-value of a car imaged in the image, the information extraction unit 2060 extracts, for example, a color, a license plate number, or the like of the car. Thus, the user of the object information extraction apparatus 2000 can determine, for example, whether or not a specific car is imaged in the video.

The information extraction unit 2060 extracts the object information from various images among a plurality of images corresponding to predetermined unit time for each partial area. For example, the information extraction unit 2060 extracts the information of the object in the partial area from each of the consecutive images corresponding to the number indicated by the frequency information for the partial area among a plurality of images corresponding to the unit time for each partial area. Here, suppose that the frequency information for the partial area indicates the frequency "5 images/second" and the frame rate of the acquired video is 15 fps. In this case, the information extraction unit 2060 extracts the information of the object in the corresponding partial area from each of five consecutive images among 15 images. Further, for example, the information extraction unit 2060 extracts the object information at equal intervals from each image corresponding to the predetermined unit time. In the case of the example in which the frequency information and the frame rate of the video have been described above, the information extraction unit 2060 repeats a process of "extracting the object information from the corresponding partial area of one image and not extracting the object information from the corresponding partial area of two consecutive images". Further, for example, the information extraction unit 2060 may randomly select images corresponding to the number indicated by the frequency information for each partial area from among a plurality of images corresponding to the predetermined time for each partial area, and extract the object information from the partial area in each of the selected images.

With the above-described configuration, the object information extraction apparatus 2000 determines the frequency of extraction of the object information for each partial area of the acquired image. Also, the object information extraction apparatus 2000 extracts the information of the object included in each partial area at the frequency determined for each partial area. Accordingly, the object information extraction apparatus 2000 increases the frequency indicated by the frequency information for a partial area in which it is necessary to frequently extract the object information, such as a partial area in which the amount of motion of the object is large or a partial area in which the object is large. Thus, the object information extraction apparatus 2000 extracts, at a high frequency, object information from the object in the partial area in which it is necessary to extract the object information frequently. On the other hand, the object information extraction apparatus 2000 decreases the frequency indicated by the frequency information for a partial area in which a frequency of acquisition of the object information is acceptable to be low, such as a partial area in which an amount of motion of the object is small or a partial area in which the object is small. Thus, the object information extraction apparatus 2000 extracts the object information at a low frequency from the object of the partial area in which the frequency of acquisition of the object information is acceptable to be low. Thus, the object information extraction apparatus 2000 sets the frequency of extraction of the object information for each partial area. Thus, in the object information extraction apparatus 2000, time taken for the object information extraction process is shortened in comparison with a case in which object information is uniformly extracted from all objects. Accordingly, the object information extraction apparatus 2000 can reliably acquire the necessary object information.

Hereinafter, a plurality of exemplary embodiments having the above-described configuration will be described in detail.

[Exemplary Embodiment 1]
<Overview>

The object information extraction apparatus 2000 of this exemplary embodiment uses, as a partial area, a divided area that is each area obtained by dividing the image acquired by the image acquisition unit 2020 in one or more positions.

Figure 2:
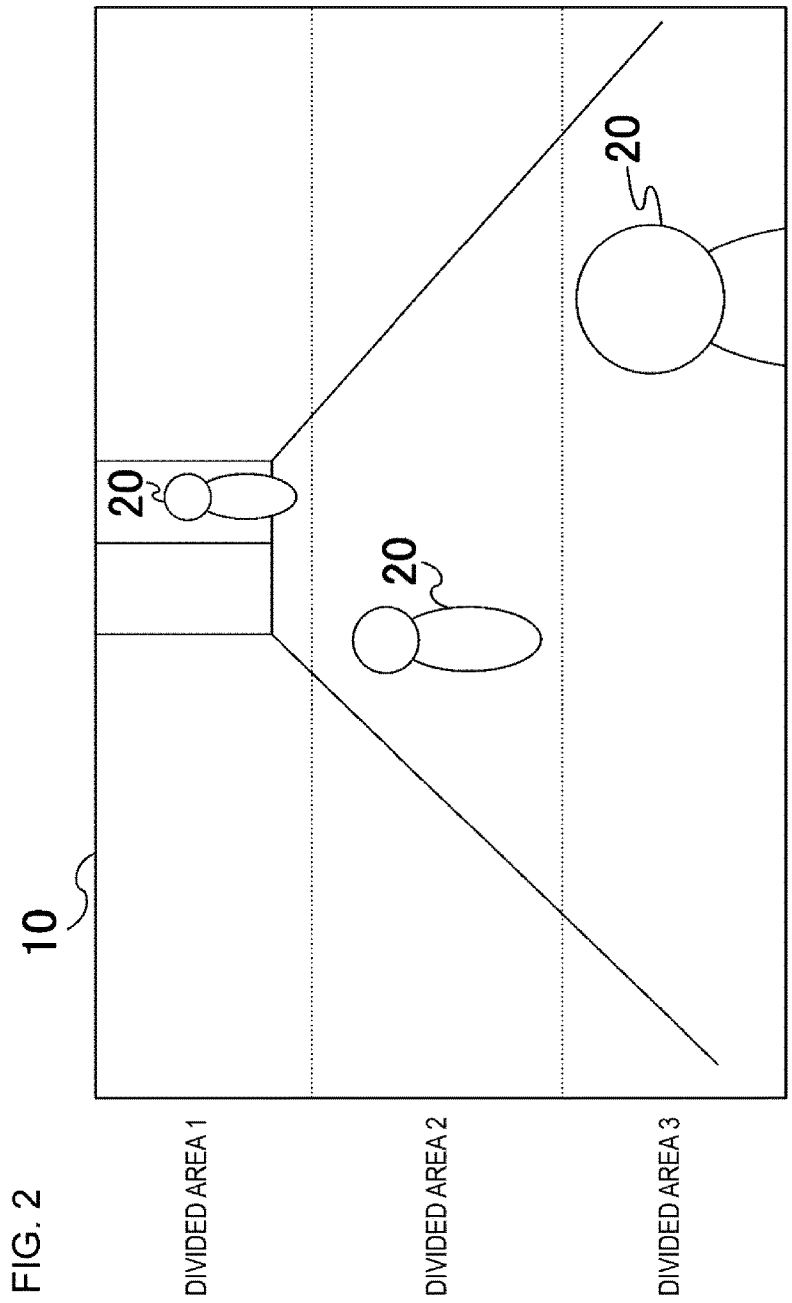
FIG. 2 is a diagram illustrating an example in which an image is vertically divided into three divided areas.

For example, the object information extraction apparatus 2000 of this exemplary embodiment separates each image into divided areas, as in an image 10 illustrated in FIG. 2. In FIG. 2, a dotted line is a line separating the divided areas. The image 10 is vertically divided into 3 areas, and divided area 1, 2 and 3 are divided areas. Each object 20 is an object imaged in the image 10.

The frequency determination unit 2040 of this exemplary embodiment acquires a frequency index shown for each-described divided area. Hereinafter, the frequency index shown for each divided area is referred to as a divided area frequency index. Also, the frequency determination unit 2040 generates the frequency information for each divided area based on the above-described frequency index.

The information extraction unit 2060 extracts the object information of the object included in each divided area from each image corresponding to the number indicated by the frequency information for each divided area among a plurality of images corresponding to the predetermined unit time for each divided area.

As described above, the object information extraction apparatus 2000 of this exemplary embodiment determines a frequency of extraction of the object information for each divided area obtained by dividing each image acquired by the image acquisition unit 2020 in one or more positions. Also, the object information extraction apparatus 2000 extracts object information from each divided area at the frequency determined for each divided area. Accordingly, the object information extraction apparatus 2000 can determine a frequency of extraction of the object information according to a feature of each divided area of the image.

For example, in FIG. 2, the object 20 imaged in divided area 3 is closer to a camera than the object 20 imaged in divided area 1. Therefore, motion on the screen of the object 20 imaged in divided area 3 is faster than that of the object 20 imaged in the divided area 1 even when the actual speed of the objects 20 is the same. Therefore, it is necessary for the object information extraction apparatus 2000 to extract the object information from the object 20 imaged in divided area 3 at a higher frequency. Accordingly, for example, the frequency determination unit 2040 acquires a divided area frequency index with a size relationship of "divided area frequency index of divided area 1<divided area frequency index of divided area 2<divided area frequency index of divided area 3". Thus, the information extraction unit 2060 acquires the object information from each divided area at the different frequencies as shown in the size relationship.

Hereinafter, details of this exemplary embodiment will be described.

<Method of Dividing an Image into Divided Areas>

There are various methods of dividing an image into divided areas in the object information extraction apparatus 2000. For example, the object information extraction apparatus 2000 uses areas obtained by dividing each image using a straight line as divided areas, as in FIG. 2. Further, the object information extraction apparatus 2000 may use, for example, each area obtained by concentrically dividing an image as a divided area, as in FIG. 3. Further, the object information extraction apparatus 2000 may divide an image into divided areas using a combination of a straight line and a curved line.

Figure 3:
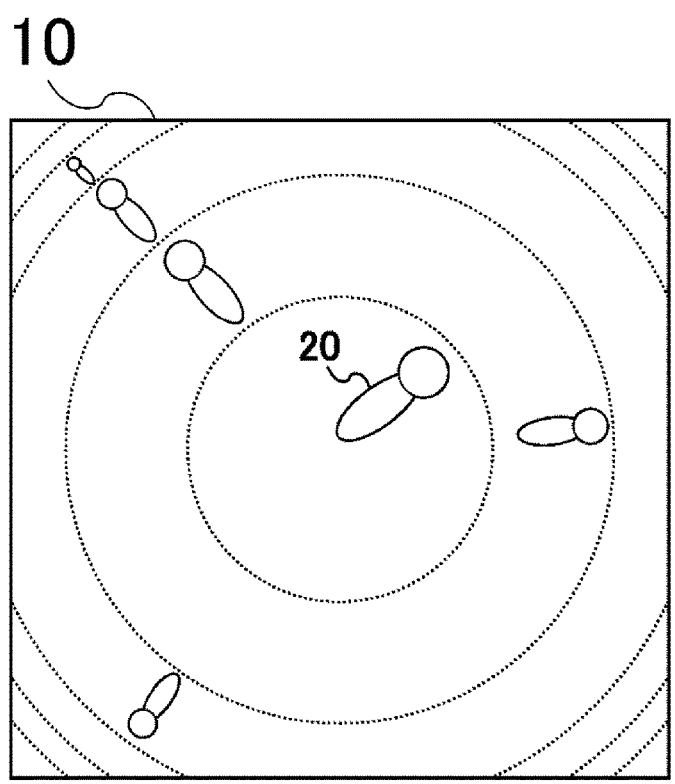
FIG. 3 is a diagram illustrating an example in which an image is concentrically divided into divided areas.

It is preferable for the method of separating the divided areas to be determined according to an angle of view of the camera. For example, when an image is acquired from a camera installed in a ceiling to photograph an oblique lower portion, a method of dividing an image into divided areas through the division illustrated in FIG. 2 is preferable. This is because an amount of motion and a size of the object are different between an upper portion and a lower portion of the image when the oblique lower portion is photographed from the ceiling. Further, for example, in the case of a camera, which photographs a portion directly under a ceiling using a fisheye lens, a method of dividing an image through the division illustrated in FIG. 3 is preferable. This is because, in the case of the fisheye lens, the amount of motion of the object and the size of the object are changed according to a distance from a center of the image.

<Hardware Configuration>

Figure 10:
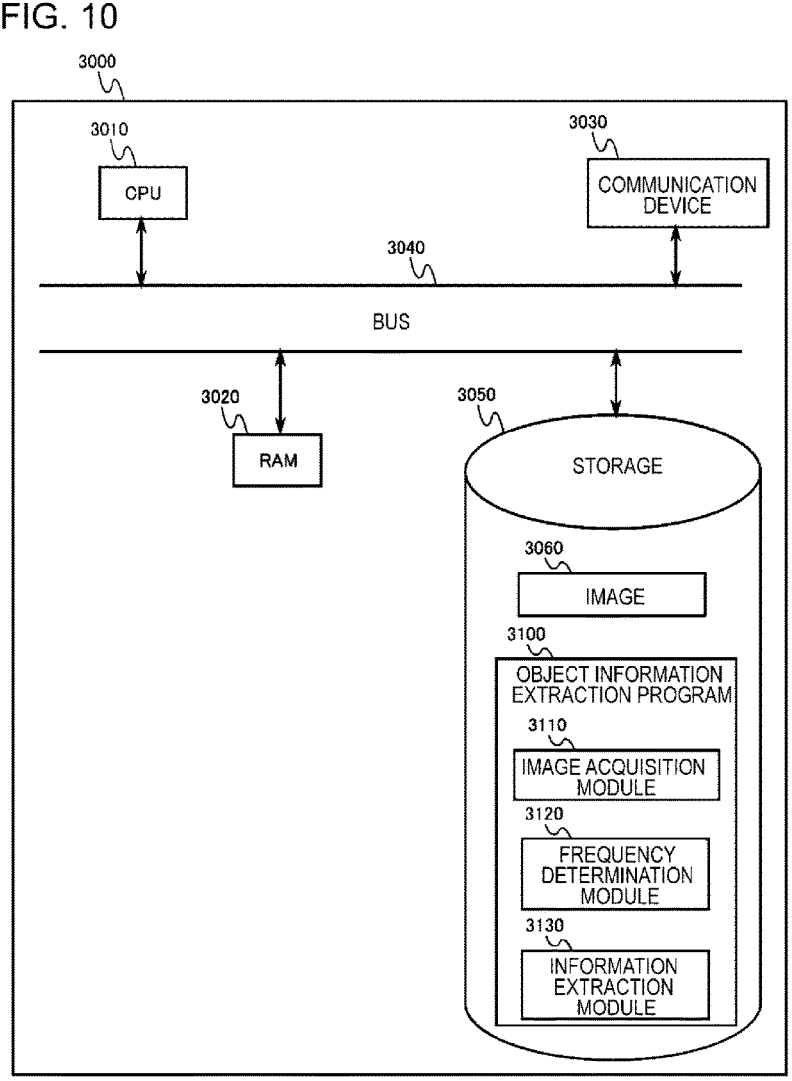
FIG. 10 is a diagram illustrating a hardware configuration of an object information extraction apparatus according to Exemplary Embodiment 1.

A computer 3000 illustrated in FIG. 10 implements the object information extraction apparatus 2000, for example. The computer 3000 includes, for example, a CPU 3010, a RAM 3020, a communication device 3030 and storage 3050. A bus 3040 connects the CPU 3010, the RAM 3020, the communication device 3030 and the storage 3050. The storage 3050 stores an object information extraction program 3100 that is a program causing the computer 3000 to function as the object information extraction apparatus 2000. Further, the storage 3050 stores a general-purpose program such as an operating system (OS) or general-purpose data used by the OS or the like. In FIG. 10, the general-purpose program and data are omitted.

The computer 3000 reads the object information extraction program 3100 from the storage 3050 and executes the object information extraction program 3100 in the CPU 3010 to function as the object information extraction apparatus 2000. The RAM 3020 appropriately stores the object information extraction program 3100 read from the storage 3050 or primary data such as a calculation result.

The object information extraction program 3100 includes an image acquisition module 3110 that implements a function of the image acquisition unit 2020, a frequency determination module 3120 that implements a function of the frequency determination unit 2040, and an information extraction 3130 that implements a function of the information extraction unit 2060. For example, the image acquisition module 3110 acquires a video captured by the monitoring camera or the like through a communication device 3030, and stores each image constituting the acquired video in the storage 3050 as an image 3060. Here, the image 3060 may be stored in the RAM 3020.

The object information extraction program 3100 may be stored in a place other than the storage 3050. For example, the object information extraction program 3100 is stored in the RAM 3020. Further, for example, when the computer 3000 includes a read-only memory (ROM), the object information extraction program 3100 may be stored in the ROM.

<Details of Frequency Determination Unit 2040>

The frequency information generated by the frequency determination unit 2040 is represented, for example, in the frequency table 200 illustrated in FIG. 4. The frequency table 200 includes, for example, a partial area ID 210, and a frequency 220 indicating a frequency of extraction of the object information from each partial area. In the case of this exemplary embodiment, the frequency 220 indicates, for example, the number of images from which the object information is extracted among a plurality of images corresponding to the predetermined unit time for each of the divided areas. For example, when the frequency information for divided area 1 is shown as in record 1 of FIG. 4, the object information extraction apparatus 2000 extracts information of the object included in divided area 1 from five images among a plurality of images corresponding to the predetermined unit time.

The frequency determination unit 2040 determines the frequency indicated by the frequency information based on the acquired divided area frequency index. Here, the frequency determination unit 2040 may use the acquired divided area frequency index as the frequency indicated by the frequency information as it is or may calculate a different value from the acquired divided area frequency index and use the calculated value as the frequency indicated by the frequency information.

There are various divided area frequency indexes acquired by the frequency determination unit 2040. For example, the frequency determination unit 2040 acquires the divided area frequency index indicating the number of images from which the object information is acquired among a plurality of images corresponding to the predetermined unit time for each of the divided areas. In this case, the frequency determination unit 2040 determines, for example, the frequency indicated by the frequency information as follows. Here, suppose that the value indicated by the divided area frequency index for a certain divided area j is $X(j)$, and the frame rate of the video acquired by the image acquisition unit 2020 is FR. When the divided area frequency index $X(j)$ for divided area j satisfies $X(j) \geq FR$, the frequency determination unit 2040 generates frequency information indicating the frequency "FR images/second". This means that the object information extraction apparatus 2000 extracts object information from divided area j of all images. Further, when $FR > X(j) > 0$, the frequency determination unit 2040 generates frequency information indicating the frequency "$X(j)$ images/second". This means that the object information extraction apparatus 2000 extracts the object information from divided area j of $X(j)$ images among images captured for one second. Furthermore, when $X(j) \leq 0$, the frequency determination unit 2040 generates frequency information indicating the frequency "0 images/second". This means that the object information extraction apparatus 2000 does not extract the object information from divided area j.

Further, the frequency determination unit 2040 may acquire the divided area frequency index represented by a rank such as 1 to N. In this case, the frequency determination unit 2040 defines, for example, the frequency information corresponding to the rank indicated by the divided area frequency index, as "when $X(j)=1$, 5 images/second" and "when $X(j)=2$, 3 images/second" in advance. Further, for example, the frequency determination unit 2040 may represent a value calculated using the rank indicated by the divided area frequency index through the frequency information. For example, when the value of the rank indicated by the divided area frequency index is $X(j)$, the frequency determination unit 2040 generates frequency information indicating a frequency "$FR/X(j)$ images for one second". Accordingly, the object information extraction apparatus 2000 extracts the object information from each partial area at a frequency that is inverse proportional to the rank for each partial area.

The divided area frequency index acquired by the frequency determination unit 2040 is determined using various methods. For example, a case in which the object information extraction apparatus 2000 extracts the object information from the video of the monitoring camera is considered. In this case, for example, the user of the object information extraction apparatus 2000 sets a training period before an operation of the object information extraction apparatus 2000, analyzes the video captured by the monitoring camera, and determines the divided area frequency index to be given to the frequency determination unit 2040. For example, the user of the object information extraction apparatus 2000 moves the same object to various positions in the angle of view of the camera at the same speed to photograph the object. Also, the user of the object information extraction apparatus 2000 analyzes a difference in the speed or the size of the object recorded in the image. Also, based on a result of the analysis, the user of the object information extraction apparatus 2000 determines the divided area frequency index for each divided area.

For example, the frequency determination unit 2040 acquires the divided area frequency index indicating a high frequency for the divided area in which the speed of the object in the image is high. For example, the divided area frequency index is calculated as a statistical value, such as an average value, a median, or a mode of results of measurement obtained by measuring the speed of the object in the divided area multiple times. Further, the statistical value may be calculated from a value of a measurement result obtained by excluding a certain percentage (for example, 5%) on the outer side in a distribution for a result of measuring the speed of the object in the divided area. Thus, outliers are excluded in the calculation of the statistical value.

Further, the frequency determination unit 2040 acquires, for example, the divided area frequency index indicating a high frequency for the divided area in which the object in the image is large. Furthermore, the frequency determination unit 2040 acquires, for example, the divided area frequency index indicating a high frequency for an area in which brightness is high in the image. It is preferable for the divided area frequency index to be calculated using statistical processing, similarly to the case in which the speed of the object is used.

Here, in the training period, the size or the speed of the object imaged by the camera can be set according to the purpose of the user of the object information extraction apparatus 2000. Further, for example, an object such as that painted with one color, which is easily subjected to analysis, can be adopted as the object used for training. Therefore, it is easy to set the training period and determine the divided area frequency index in comparison with determining the divided area frequency index after starting an operation of the object information extraction apparatus 2000. However, the divided area frequency index may be determined after an operation of the object information extraction apparatus 2000 starts.

<Details of Information Extraction Unit 2060>

When a feature-value of the object is acquired as object information, it is necessary for the information extraction unit 2060 to recognize a position within the image of the object of which a feature-value is to be extracted. There are various methods in which the information extraction unit 2060 recognizes the position within the image of each object. For example, the information extraction unit 2060 acquires information on the position of each object detected from an external apparatus such as an infrared sensor detecting the position of the object from the external apparatus. Further, the information extraction unit 2060 may acquire the information on the position of each object detected by an external apparatus, which performs image processing and detects the position of each object from the external apparatus. Further, for example, the information extraction unit 2060 may perform a process of extracting the position of the object as an object information extraction process to extract the position of each object, and then, perform a process of extracting a feature-value of each object the position of which is identified by the extracted information.

<Flow of Object Information Extraction Process>

Figure 5:
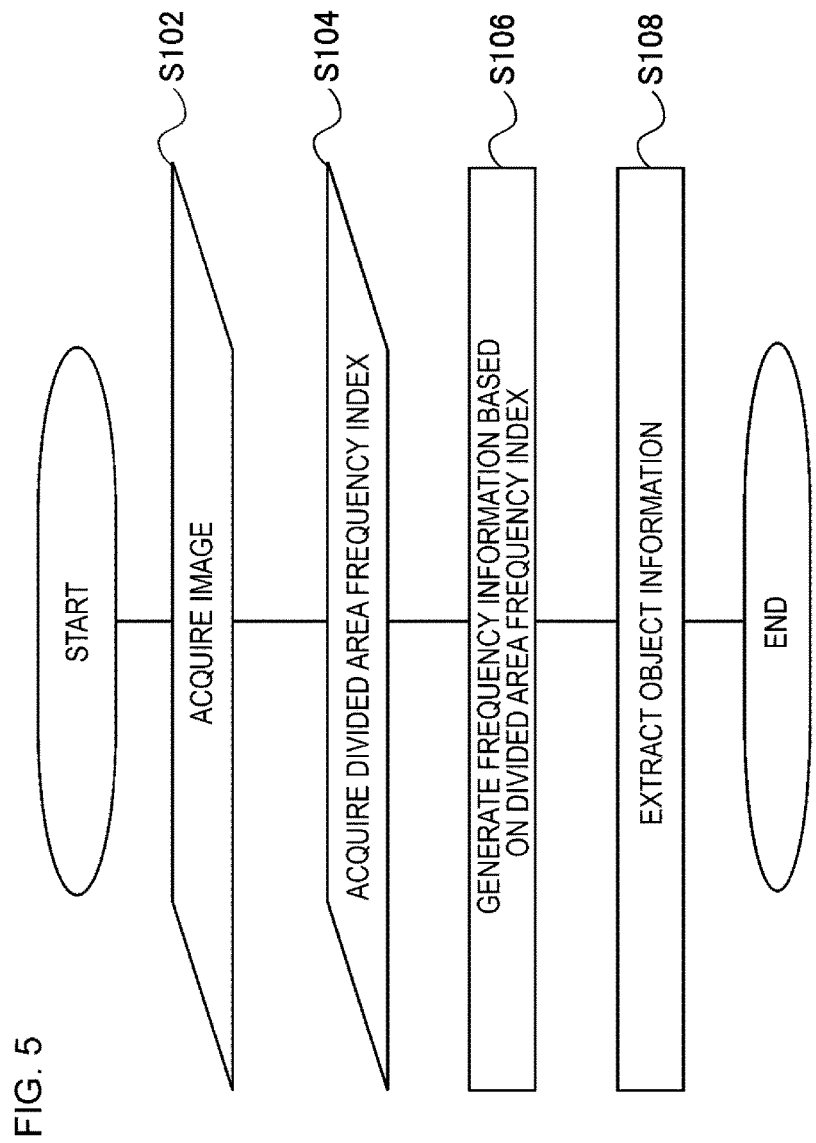
FIG. 5 is a flowchart illustrating an example of a flow of an object information extraction process in Exemplary Embodiment 1.

FIG. 5 is a flowchart illustrating an example of a flow of a process with which the object information extraction apparatus 2000 extracts object information (hereinafter, object information extraction process).

In step S102, the image acquisition unit 2020 acquires an image constituting a video.

In step S104, the frequency determination unit 2040 acquires a divided area frequency index.

In step S106, the frequency determination unit 2040 generates the frequency information for each divided area based on the acquired frequency index.

In step S108, the information extraction unit 2060 extracts the object information of the object included in each divided area from each image corresponding to the number indicated by the frequency information for each divided area among the plurality of images corresponding to a unit time for each divided area.

<Modification Example>

The object information extraction apparatus 2000 may generate the frequency information for each divided area based on an imaging range of the video acquired by the image acquisition unit 2020. Suppose that the object information extraction apparatus 2000 acquires a video obtained by a camera installed in the ceiling photographing an oblique lower portion. In this case, when an angle of declination of the camera changes, an amount of motion or a size of the object in the image changes. For example, as the angle of declination of the camera becomes small, a difference in the speed and the size between a nearby object and a distant object increases. Therefore, the object information extraction apparatus 2000 generates the frequency information of each divided area based on the imaging range of the video.

For example, in the case of an example of the camera, the object information extraction apparatus 2000 increases a difference in the frequency between the divided areas as the angle of declination of the camera becomes small.

There are various methods of generating the frequency information based on the imaging range of the video. For example, the object information extraction apparatus 2000 acquires a different divided area frequency index depending on the change of the imaging range of the video. Further, for example, the object information extraction apparatus 2000 acquires a plurality of divided area frequency indexes depending on the imaging range of the video in advance. Also, the object information extraction apparatus 2000 uses the divided area frequency index corresponding to the imaging range of the video.

There are various methods in which the object information extraction apparatus 2000 acquires the information indicating the imaging range of the video. For example, the object information extraction apparatus 2000 acquires the information indicating the imaging range of the video from an apparatus such as a camera photographing the video acquired by the image acquisition unit 2020. That is a value of the angle of declination of the camera in the example described above, for example. Further, the object information extraction apparatus 2000 may calculate, for example, a change of the imaging range of the video from a change in a background of the image.

<Operational Advantages>

With the above-described configuration, according to this exemplary embodiment, the object information extraction apparatus 2000 uses the divided areas obtained by dividing the image acquired by the image acquisition unit 2020 in one or more positions as partial areas. The frequency determination unit 2040 acquires the divided area frequency index shown for each-described divided area, and generates the frequency information of each divided area. The information extraction unit 2060 extracts the object information of the object included in each divided area from each of the images corresponding to the number indicated by the frequency information regarding each divided area among a plurality of images corresponding to the unit time for each divided area. Accordingly, the object information extraction apparatus 2000 can determine a frequency of extraction of the object information depending on a feature of each divided area of the image.

[Exemplary Embodiment 2]

<Overview>

In this exemplary embodiment, the same functional units as in Exemplary Embodiment 1 have the same functions as Exemplary Embodiment 1 unless particularly mentioned.

Figure 6:
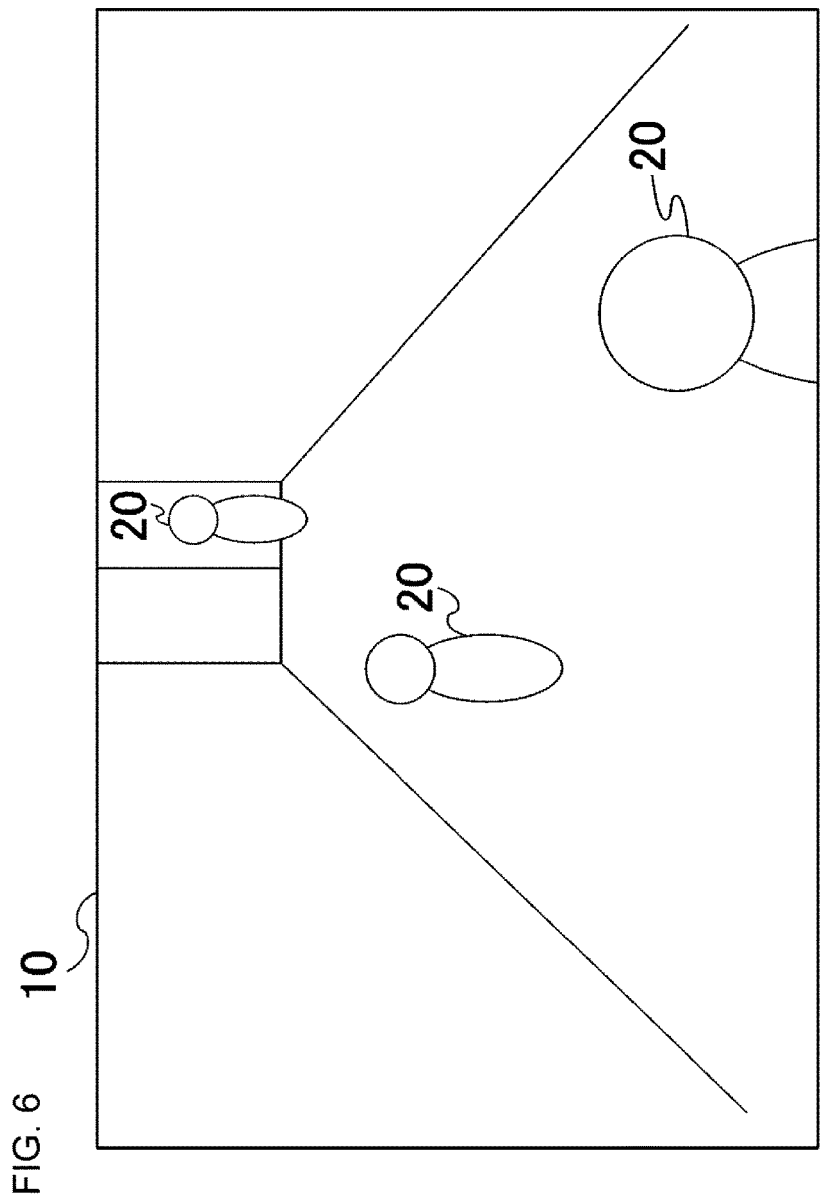
FIG. 6 is a diagram illustrating an example in which each object in an image is a partial area.

The object information extraction apparatus 2000 of this exemplary embodiment deals with an individual area representing the object in the image as the above-described partial area. For example, in the case of an image illustrated in FIG. 6, the object information extraction apparatus 2000 deals with each object 20 as a partial area. FIG. 6 illustrates an image obtained by photographing a state in which a person moves through a passage.

The frequency determination unit 2040 of this exemplary embodiment acquires an amount of motion of each object as a frequency index of the object. Also, the frequency determination unit 2040 calculates a frequency index based on the acquired amount of motion of each object (hereinafter, motion amount frequency index). Here, the frequency determination unit 2040 calculates a motion amount frequency index indicating a high frequency for the object the amount of motion of which is large. Also, the frequency determination unit 2040 generates frequency information in which the motion amount frequency index calculated for each object is a frequency of extraction of the object information from the object.

The information extraction unit 2060 extracts the object information of each object from each of the images corresponding to the number indicated by the frequency information, regarding each object among a plurality of images corresponding to the predetermined unit time for each object.

As described above, the object information extraction apparatus 2000 of this exemplary embodiment deals with an individual area representing each object in the image as the partial area. Also, the object information extraction apparatus 2000 extracts the object information at a high frequency for the object of which the amount of motion on a screen is large. Thus, the object information extraction apparatus 2000 of this exemplary embodiment can determine a frequency of extraction of information from each object depending on the motion of the object, unlike the object information extraction apparatus 2000 of Exemplary Embodiment 1. For example, even when objects having different motion speeds approach within the image, the object information extraction apparatus 2000 of this exemplary embodiment can extract the object information from the respective objects at different frequencies.

Hereinafter, details of this exemplary embodiment will be described.

<Details of Frequency Determination Unit 2040>

The frequency determination unit 2040 acquires an amount of motion of the object. Here, there are various methods of representing the amount of motion acquired by the frequency determination unit 2040. For example, the amount of motion of the object indicates pixels by which the object moves within the image for each frame. Further, the amount of motion of the object indicates, for example, speed of the object in an actual space.

There are various methods in which the frequency determination unit 2040 acquires the amount of motion of the object. For example, the frequency determination unit 2040 acquires positions of respective objects in chronological order from an infrared sensor or the like that detects a position of an object. Also, the frequency determination unit 2040 calculates an amount of motion of the object from positions of the object represented in chronological order. In this case, the object information extraction apparatus 2000 further includes a motion amount calculation unit that calculates the amount of motion of the object from a change in the position of the object. Also, the frequency determination unit 2040 acquires the amount of motion calculated by the motion amount calculation unit.

Further, the object information extraction apparatus 2000 may detect the position of the object from the acquired image, and calculate the amount of motion of each object from a change in the detected position of each object. In this case, the object information extraction apparatus 2000 further includes an object detection unit that detects the position of the object from the acquired image, in addition to the motion amount detection unit. The motion amount detection unit acquires the position of each object detected by the object detection unit, and calculates the amount of motion of each object from the change in the position of each object.

Further, for example, the object information extraction apparatus 2000 may extract the position of each object as object information using the information extraction unit 2060. In this case, the motion amount detection unit calculates the motion amount of the object from the change in the position of the object acquired from the information extraction unit 2060.

Further, the frequency determination unit 2040 may acquire, for example, the motion amount of each object from another apparatus that calculates the amount of each object based on information indicating the change in the position of the object generated by the infrared sensor.

There are various methods in which the frequency determination unit 2040 determines the motion amount frequency index of each object based on the amount of motion of the object. For example, the frequency determination unit 2040 calculates a motion amount frequency index as a value proportional to the amount of motion of the object. Hereinafter, a specific example of this method is shown. In the following example, the amount of motion of the object is constant, and the amount is assumed to be v pixels/second (v>0).

For example, the frequency determination unit 2040 calculates the motion amount frequency index of each object according to Equation 1 below. Freq_M(i) is a motion amount frequency index indicating the number of images from which the object information is extracted for one second for an object i the ID of which is i. F(v) is a monotonous non-decrease function between 0 and 1.

$$\text{Freq\_M}(i) = FR * R \quad \text{[Equation 1]}$$

$$\text{where, } R = \begin{cases} 1 & (v > v_0) \\ F(v) & (0 \le v \le v_0) \end{cases}$$

When Equation 1 above is used, for example, if a frame rate is 15 fps, the motion amount frequency index for object i is 15R images/second. Therefore, the object information extraction apparatus 2000 extracts the object information of object i from 15R images among images captured for one second.

Further, there are various F(v) used in Equation 1 above. For example, a linear function shown in Equations 2 below is used.

$$F(v) = \frac{1-\varepsilon}{v_0} v + \varepsilon \quad \text{[Equation 2]}$$

$$\text{where, } 0 \le \varepsilon < 1$$

Freq_M(i) calculated using Equations 1 and 2 linearly increases as the amount of motion of the object becomes large. Further, if the amount of motion becomes larger than $v_0$ pixels/second, Freq_M(i) is equal to a frame rate. In this case, the object information extraction apparatus 2000 extracts object information for the object i from all images.

Further, F(v) is represented, for example, as a function shown in Equations 3 to 5 below.

$$F(v) = (1-\varepsilon)\left(\frac{v}{v_0}\right)^\alpha + \varepsilon \text{ where, } \alpha > 0 \quad \text{[Equation 3]}$$

-continued $$F(v) = \exp(\alpha(v - v_0)) \text{ where, } \alpha = -\frac{1}{v_0}\log\varepsilon \quad \text{[Equation 4]}$$

$$F(v) = (1-\varepsilon)\sin^\alpha\left(\frac{\pi v}{2v_0}\right) + \varepsilon \text{ where, } \alpha > 0 \quad \text{[Equation 5]}$$

Further, only motion in a specific direction rather than the entire motion of the object may be used for calculation of the motion amount frequency index. For example, in the case of FIG. 6, motion in the direction of the passage among motions of objects on the screen becomes important. Therefore, in the case of FIG. 6, the frequency determination unit 2040 may calculate the motion amount frequency index only using a motion component in the direction of the passage among the motions of the object. For example, the frequency determination unit 2040 defines a vector indicating a specific direction used for calculation of the motion amount frequency index for each position on the screen. Also, the frequency determination unit 2040 calculates a motion component in a vector direction corresponding to the position of the object, based on a vector corresponding to the position of the object and the amount of motion of the object. The motion component in the specific direction can be calculated by calculating a dot product of a unit vector in the specific direction and a vector indicating the motion of the object. Also, the frequency determination unit 2040 calculates the motion amount frequency index using the amount of motion in the specific vector direction. Further, the calculation of the motion amount frequency index may be performed based on motion of the object differently weighted in respective directions on the screen (for example, an X direction and a Y direction). Thus, the frequency determination unit 2040 can calculate the motion amount frequency index in such a manner that motion in a direction in which importance is high is greatly reflected to a value of the motion amount frequency index while considering the motion in each direction.

<Flow of Object Information Extraction Process>

Figure 7:
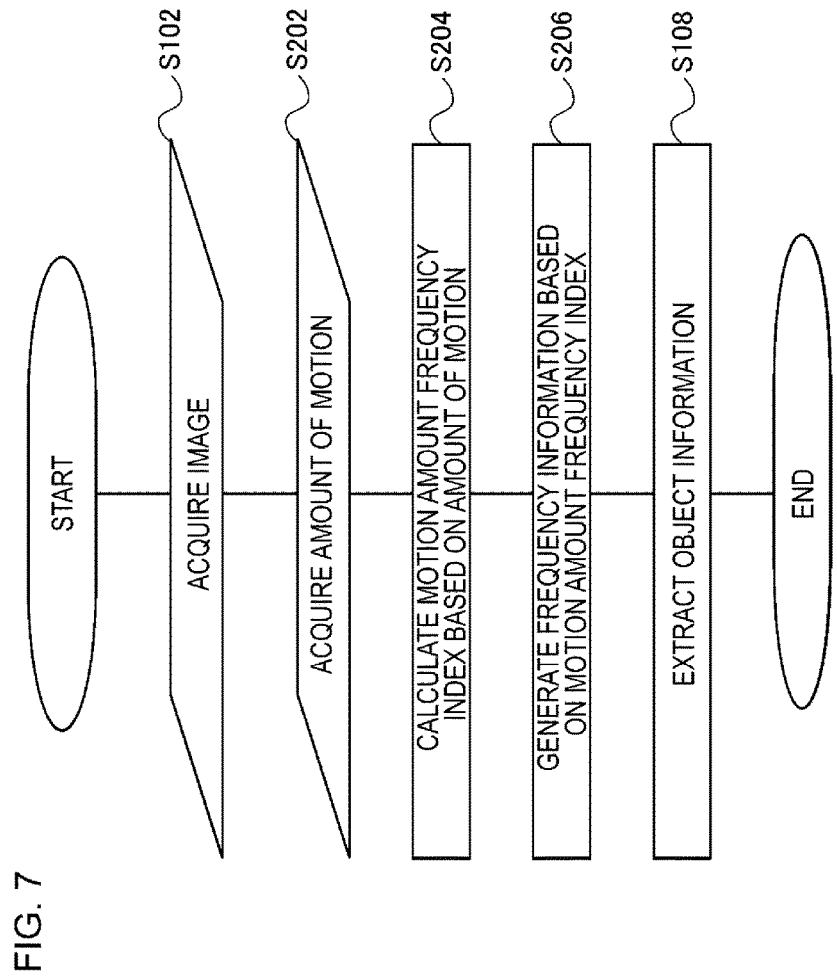
FIG. 7 is a flowchart illustrating an example of a flow of an object information extraction process in Exemplary Embodiment 2.

FIG. 7 is a flowchart illustrating an example of a flow of the object information extraction process in the object information extraction apparatus 2000 in this exemplary embodiment. Here, in FIG. 7, steps denoted with the same reference signs as in FIG. 5 are the same processes as the processes denoted with the same reference signs in FIG. 5, and thus description thereof will be omitted.

In step S202, the frequency determination unit 2040 acquires an amount of motion of each object.

In step S204, the frequency determination unit 2040 calculates a motion amount frequency index of each object based on the amount of motion of each object.

In step S206, the frequency determination unit 2040 generates the frequency information of each object based on a motion amount frequency index of each object.

<Operational Advantage>

With the above-described configuration, according to this exemplary embodiment, the object information extraction apparatus 2000 deals with an individual area representing each object within the image as a partial area. The frequency determination unit 2040 acquires an amount of motion of each object as a frequency index of the object. Also, the frequency determination unit 2040 calculates a motion amount frequency index of each object and generates frequency information indicating the calculated motion amount frequency index as a frequency. Regarding each object, the information extraction unit 2060 extracts the object information of each object from each of the images corresponding to the number indicated by the frequency information among a plurality of images corresponding to the predetermined unit time. Thus, the object information extraction apparatus 2000 of this exemplary embodiment can determine the frequency of extraction of information from each object depending on the motion of the object, unlike the object information extraction apparatus 2000 of Exemplary embodiment 1.

[Exemplary Embodiment 3]

The object information extraction apparatus 2000 in this exemplary embodiment sets an individual area representing each object as the partial area.

The frequency determination unit 2040 in this exemplary embodiment acquires an amount of motion of each object. Also, the frequency determination unit 2040 calculates a motion amount frequency index for each object. The frequency determination unit 2040 further acquires the divided area frequency index of each divided area obtained by dividing each image. Also, the frequency determination unit 2040 calculates the frequency for each object based on the motion amount frequency index of the object and the divided area frequency index of the divided area including the object.

For example, the frequency determination unit 2040 calculates the motion amount frequency index from the acquired motion amount of the object using Equation 1, similarly to Exemplary Embodiment 2. Further, the frequency determination unit 2040 acquires a value X(j) of the divided area frequency index of each divided area, similarly to Exemplary Embodiment 1. Here, j is an ID of the divided area. Further, the frequency determination unit 2040 may newly use a value calculated based on the acquired divided area frequency index as the division amount frequency index X(j).

The frequency determination unit 2040 calculates, for example, the frequency based on both of the motion amount frequency index and the divided area frequency index by calculating the frequency FREQ(i) of object i using Equation 6 below. Here, suppose that the object i is included in the divided area j. A unit of FREQ(i) below is images/second. Alternatively, a square root of a product of Freq_M(i) and X(j) may be Freq(i).

$$Freq(i) = \frac{\text{Freq\_M}(i) * X(j)}{FR} \quad \text{[Equation 6]}$$

Further, for example, different weights are set for the motion amount frequency index and the divided area frequency index to calculate a frequency for object i, as in Equation 7 below. Wm is a weight given to the motion amount frequency index, and Wd is a weight given to the divided area frequency index.

$$Freq(i) = \text{Freq\_M}(i) * w_m + X(j) * w_d \quad \text{[Equation 7]}$$

$$(w_m + w_d = 1)$$

<Flow of Object Information Extraction Process>

Figure 8:
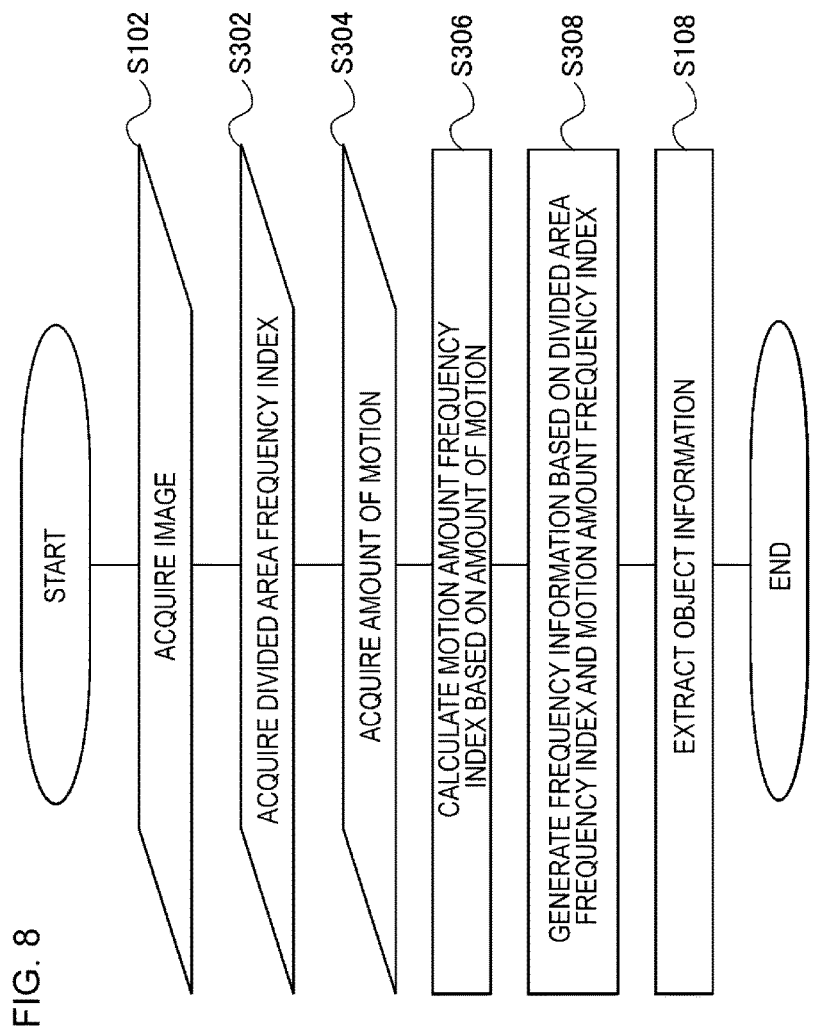
FIG. 8 is a flowchart illustrating an example of a flow of an object information extraction process in Exemplary Embodiment 3.

FIG. 8 is a flowchart illustrating an example of a flow of an object information extraction process in this exemplary embodiment. Here, in FIG. 8, steps denoted with the same reference signs as in FIG. 5 are the same processes as the processes denoted with the same reference signs in FIG. 5, and thus description thereof will be omitted.

In step S302, the frequency determination unit 2040 acquires the divided area frequency index of each divided area.

In step S304, the frequency determination unit 2040 acquires an amount of motion of each object.

In step S306, the frequency determination unit 2040 calculates the motion amount frequency index of each object based on the acquired amount of motion.

In step S308, the frequency determination unit 2040 generates the frequency information of each object based on the divided area frequency index and the motion amount frequency index.

<Modification Example>

When a plurality of objects are included in one divided area, the frequency determination unit 2040 in this exemplary embodiment may use, as the motion amount of each object, a value obtained by performing statistical processing on the motion amount of each object. Thus, a common motion amount frequency index is generated for the plurality of objects included in one divided area. Thus, the object information is extracted at the same frequency from the plurality of objects included in one divided area. Accordingly, it is possible to reduce calculation resources required for generation of the frequency information.

There are various statistical processing methods. For example, the frequency determination unit 2040 uses a value obtained by averaging the motion amounts of all objects included in one divided area as a motion amount that is common to all the objects included in the divided area. Further, for example, in the statistical processing, the frequency determination unit 2040 may calculate a value such as a median or a mode from the amounts of motion of all the objects included in the divided area. Further, the frequency determination unit 2040 may calculate a distribution of the motion amounts of the plurality of objects included in the divided area, exclude a constant percentage (for example, 5%) on the outer side in the distribution, and then, perform the above statistical processing. Thus, it is possible to calculate the motion amount commonly used for the plurality of objects included in one divided area after excluding outliers.

<Operational Advantage>

With the above-described configuration, according to this exemplary embodiment, the object information extraction apparatus 2000 determines the frequency of extraction of information from each object using both of the frequency index for the motion amount of the object and the frequency index of the divided area including the object with the frequency determination unit 2040. Accordingly, the user of the object information extraction apparatus 2000 can set the frequency of extraction of the object information from two viewpoints such as the amount of motion of the object and the position of the object. For example, a case is considered where the divided area frequency index of each divided area is set to a greater value as brightness becomes higher. In this case, the object information extraction apparatus 2000 extracts object information from the object imaged in the partial area in which the amount of motion is large and the brightness is high at a high frequency. Further, the object information extraction apparatus 2000 extracts the object information from an object located in a divided area in which the amount of motion is large and the brightness is low and an object located in a divided area in which the amount of motion is small and the brightness is high at a moderate frequency. Also, the object information extraction apparatus 2000 extracts the object information from an object located in a divided area in which the amount of motion is small and the brightness is low at a low frequency.

[Exemplary Embodiment 4]

<Overview>

The object information extraction apparatus 2000 in this exemplary embodiment uses individual areas representing respective objects as partial areas.

The frequency determination unit 2040 in this exemplary embodiment acquires an amount of motion of each object. Also, the frequency determination unit 2040 calculates a motion amount frequency index for each object. Further, the frequency determination unit 2040 acquires information on a size or a direction of each object (hereinafter, appropriateness index). Also, the frequency determination unit 2040 calculates the frequency for each object based on the motion amount frequency index of the object and the appropriateness index of the object.

There are various methods of determining the appropriateness index. For example, suppose that a case in which each person imaged in the video is an object and a feature-value of a face of each person is extracted as object information. In this case, for a large person imaged in the image, it is easy to extract a feature-value of a face. Therefore, for example, the object information extraction apparatus 2000 acquires a size of the object in the image as the appropriateness index. In this case, the value of the appropriateness index increases as the object becomes larger. Further, in the case of the above-described example, it is easy to extract a feature-value of a face for a person the face of which is directed to the front of the camera. Therefore, for example, the object information extraction apparatus 2000 uses a direction of the face of the person imaged in the image as the appropriateness frequency index. In this case, the value of the appropriateness frequency index becomes great as the face is directed in the direction of the camera. Further, the appropriateness index can be set based on various pieces of information, such as a color of clothing, a color of skin, and the like.

Further, the frequency determination unit 2040 may acquire a plurality of appropriateness indexes and calculate a value obtained by considering the appropriateness indexes as a new appropriateness index. For example, in the case of the above-described example, both of the appropriateness index determined from the size of the person and the appropriateness index determined from the direction of the face of the person are acquired, and a value obtained by multiplying the two appropriateness frequency indexes is used as a new appropriateness index.

The frequency determination unit 2040 calculates, for example, the motion amount frequency index from the acquired motion amount of the object using Equation 1, similarly to Exemplary Embodiment 2. Further, the frequency determination unit 2040 acquires a value P(i) of the appropriateness frequency index for each object. Also, the frequency determination unit 2040 determines, for example, a frequency for object i using Equation 8 below. A unit of FREQ(i) is images/second.

$$\text{Freq}(i) = \text{Freq\_}M(i) * P(i) \qquad \text{[Equation 8]}$$

Further, for example, different weights may be set for the motion amount frequency index and the appropriateness frequency index to calculate a frequency for object i, as in Equation 9 below. Wm is a weight given to the motion amount frequency index, and Wp is a weight given to the appropriateness frequency index.

$$Freq(i) = \text{Freq\_M}(i) * w_m + P(i) * FR * w_p \quad \text{[Equation 9]}$$

$$(w_m + w_p = 1)$$

<Flow of Object Information Extraction Process>

Figure 9:
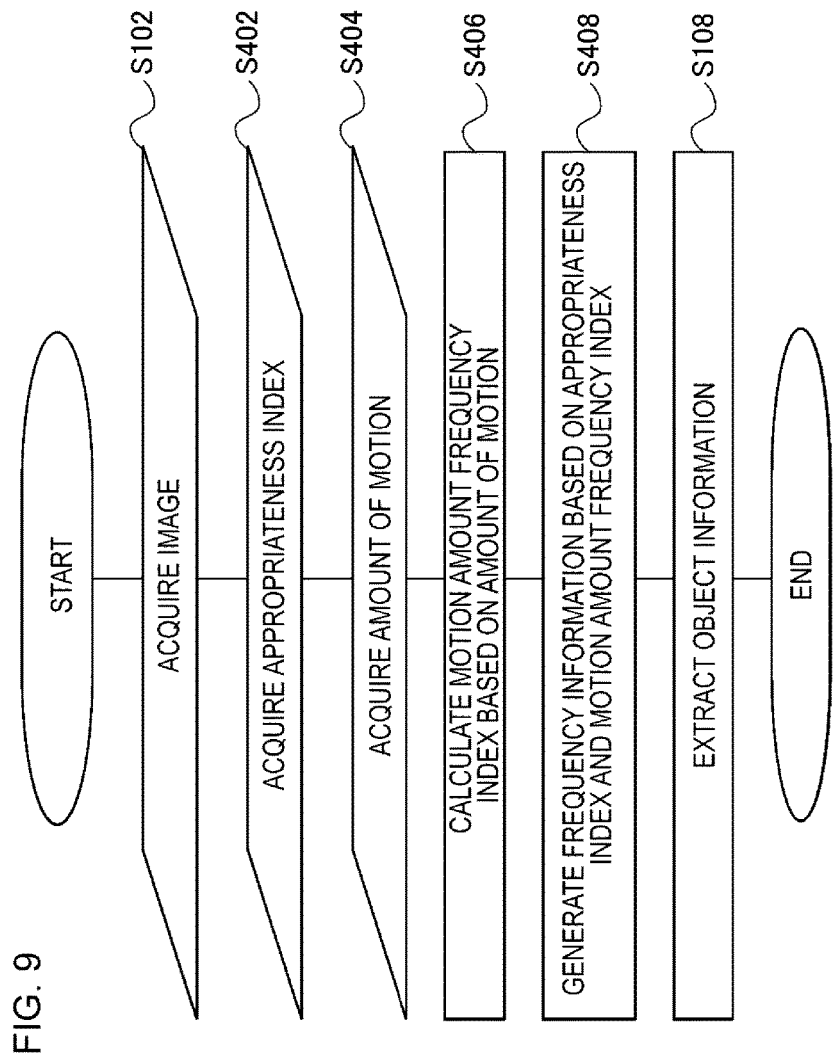
FIG. 9 is a flowchart illustrating an example of a flow of an object information extraction process in Exemplary Embodiment 4.

FIG. 9 is a flowchart illustrating an example of a flow of an object information extraction process in the object information extraction apparatus 2000 in this exemplary embodiment. Here, in FIG. 9, steps denoted with the same reference signs as in FIG. 5 are the same processes as the processes denoted with the same reference signs in FIG. 5, and thus description thereof will be omitted.

In step S402, the frequency determination unit 2040 acquires an appropriateness index of each object.

In step S404, the frequency determination unit 2040 acquires an amount of motion of each object.

In step S406, the frequency determination unit 2040 calculates a motion amount frequency index of each object based on the acquired amount of motion.

In step S408, the frequency determination unit 2040 generates the frequency information for each object based on the appropriateness index and the motion amount frequency index.

[Modification Example 1]

The frequency determination unit 2040 of this exemplary embodiment may acquire the divided area frequency index for each divided area obtained by dividing each image instead of calculating the motion amount frequency index, and generate the frequency information of each object based on the divided area frequency index and the appropriateness frequency index.

[Modification Example 2]

Further, the frequency determination unit 2040 of this exemplary embodiment may generate the frequency information of each object based on three indexes of the motion amount frequency index, the divided area frequency index, and the appropriateness frequency index.

<Operational Advantages>

With the above-described configuration, the frequency determination unit 2040 of this exemplary embodiment included in the object information extraction apparatus 2000 calculates a motion amount frequency index for each object from the amount of motion of each object. Further, the frequency determination unit 2040 further acquires the appropriateness index that is information on a size or a direction of each object. Also, the frequency determination unit 2040 calculates a frequency for each object based on the motion amount frequency index of the object and the appropriateness index of the object. Thus, the object information extraction apparatus 2000 of this exemplary embodiment can determine the frequency of extraction of the object information for each object based on various parameters, such as the size or the direction of the object.

While the exemplary embodiment and the example of the present invention have been described with reference to the drawings, these are illustrations of the present invention and various other configurations can be adopted.

<Appendix>

(Appendix 1)

An object information extraction apparatus including:

an image acquisition unit that acquires a plurality of image frames corresponding to predetermined unit time of a video;

a frequency determination unit that acquires a plurality of pieces of different frequency information for a plurality of partial areas included in each of the image frames, the image frame being acquired by the image acquisition unit; and an information extraction unit that extracts object information from at least one of the plurality of partial areas by executing image processing for image frames corresponding to the number corresponding to the frequency information of the partial area among the plurality of image frames for each partial area, the frequency information being acquired by the frequency determination unit.

(Appendix 2)

The object information extraction apparatus described in appendix 1, wherein each partial area is a divided area that is an image area obtained by dividing each image frame, the image frame being acquired by the image acquisition unit, at least one of the plurality of partial areas includes an individual area representing a predetermined object, and the information extraction unit extracts object information of the predetermined object from the individual area by executing image processing for image frames corresponding to the number corresponding to the frequency information of the at least one partial area among the plurality of image frames for the individual area in the at least one partial area, the frequency information being acquired by the frequency determination unit.

(Appendix 3)

The object information extraction apparatus described in appendix 1, wherein the partial area represents a predetermined object, wherein the frequency determination unit acquires the motion amount of a plurality of predetermined objects represented by the plurality of partial areas, wherein the frequency determination unit determines each frequency index indicating a high index depending on a size of the motion amount wherein the frequency determination unit determines a plurality of pieces of frequency information regarding the plurality of predetermined objects based on each frequency index, and wherein the information extraction unit extracts each object information of the predetermined object by executing image processing for image frames corresponding to the number corresponding to the frequency information of the predetermined object among the plurality of image frames for each predetermined object represented for each partial area, the frequency information being acquired by the frequency determination unit.

(Appendix 4)

The object information extraction apparatus according to appendix 3, wherein the frequency determination unit determines a plurality of frequency indexes for a plurality of divided areas, the divided areas being image areas obtained by dividing each image frame, the image frame being acquired by the image acquisition unit wherein the frequency determination unit determines a plurality of pieces of frequency information for a plurality of predetermined objects using the frequency index, based on the motion amount and the frequency index for the divided area including the individual area representing the predetermined object.

(Appendix 5)

The object information extraction apparatus according to appendix 3 or 4, wherein the frequency determination unit acquires information of a size or a direction for each predetermined object wherein the frequency determination unit determines each frequency index based on the information of a size or a direction, and wherein the frequency determination unit extracts object information of each predetermined object using each frequency index based on the information of a size or a direction.

(Appendix 6)

The object information extraction apparatus according to any one of appendixes 3 to 5, further comprising:

an object detection unit that detects the predetermined object from the plurality of image frames acquired by the image acquisition unit; and a motion amount detection unit that detects an amount of motion of the predetermined object detected by the object detection unit, wherein the frequency determination unit acquires the motion amount of the predetermined object detected by the motion amount detection unit.

(Appendix 7)

The object information extraction apparatus according to appendix 4, wherein when the plurality of predetermined objects are included in the divided area, the frequency determination unit calculates a frequency index based on a common motion amount for the plurality of predetermined objects, the frequency determination unit using a value obtained by performing statistical processing on the motion amount of the plurality of predetermined objects as the motion amount of the plurality of predetermined objects.

(Appendix 8)

The object information extraction apparatus described in appendix 2 or 4, wherein the frequency determination unit generates frequency information for each divided area based on an imaging range of the image.

(Appendix 9)

An object information extraction program for causing a computer to function as an object information extraction apparatus, the program causing the computer to include:

an image acquisition function of acquiring a plurality of image frames corresponding to a predetermined unit time of a video;

a frequency determination function of acquiring a plurality of pieces of different frequency information for a plurality of partial areas included in each of the image frames, the image frame being acquired with the image acquisition function; and an information extraction function of extracting object information from at least one of the plurality of partial areas by executing image processing for image frames corresponding to the number corresponding to the frequency information of the partial area among the plurality of image frames for each partial area, the frequency information being acquired using the frequency determination function.

(Appendix 10)

The object information extraction program described in appendix 9, wherein each partial area is a divided area that is an image area obtained by dividing each image frame, the image frame being acquired with the image acquisition function, at least one of the plurality of partial areas includes an individual area representing a predetermined object, and the information extraction function extracts object information of the predetermined object from the individual area by executing image processing for image frames corresponding to the number corresponding to the frequency information of the at least one partial area among the plurality of image frames for the individual area in the at least one partial area, the frequency information acquired with the frequency determination function.

(Appendix 11)

The object information extraction program described in appendix 9, wherein the partial area represents a predetermined object, wherein the frequency determination function acquires the motion amount of a plurality of predetermined objects represented by the plurality of partial areas wherein the frequency determination function determines each frequency index indicating a high index depending on a size of the motion amount, wherein the frequency determination function determines a plurality of pieces of frequency information regarding the plurality of predetermined objects based on each frequency index, and wherein the information extraction function extracts each object information of the predetermined object by executing image processing for image frames corresponding to the number corresponding to the frequency information of the predetermined object among the plurality of image frames for each predetermined object represented for each partial area, the frequency information being acquired with the frequency determination function.

(Appendix 12)

The object information extraction program described in appendix 11, wherein the frequency determination function further determines a plurality of frequency indexes for a plurality of divided areas, the divided areas being image areas obtained by dividing each image frame, the image frame being acquired with the image acquisition function, wherein the frequency determination function determines a plurality of pieces of frequency information for a plurality of predetermined objects using the frequency index, based on the motion amount and the frequency index for the divided area including the individual area representing the predetermined object.

(Appendix 13)

The object information extraction program described in appendix 11 or 12, wherein the frequency determination function acquires information of a size or a direction for each predetermined object, wherein the frequency determination function determines each frequency index based on the information of a size or a direction, wherein the frequency determination function extracts object information of each predetermined object using each frequency index based on the information of a size or a direction.

(Appendix 14)

The object information extraction program described in any one of notes 11 to 13, the program causes the computer to further include:

an object detection function of detecting the predetermined object from the plurality of image frames acquired using the image acquisition function; and a motion amount detection function of detecting an amount of motion of the predetermined object detected using the object detection function, wherein the frequency determination function acquires the motion amount of the predetermined object detected using the motion amount detection function.

(Appendix 15)

The object information extraction program described in appendix 12, wherein when the plurality of predetermined objects are included in the divided area, the frequency determination function calculates a frequency index based on a common motion amount for the plurality of predetermined objects, the frequency determination function using a value obtained by performing statistical processing on the motion amount of the plurality of predetermined objects as the motion amount of the plurality of predetermined objects.

(Appendix 16)

The object information extraction program described in appendix 10 or 12, wherein the frequency determination function generates frequency information for each divided area based on an imaging range of the image.

(Appendix 17)

An object information extraction method for causing a computer to function as an object information extraction apparatus, the method including:

an image acquisition step of acquiring, by the computer, a plurality of image frames corresponding to a predetermined unit time of a video;

a frequency determination step of acquiring, by the computer, a plurality of pieces of different frequency information for a plurality of partial areas included in each of the image frames, the image frame being acquired in the image acquisition step; and an information extraction step of extracting, by the computer, object information from at least one of the plurality of partial areas by executing image processing for image frames corresponding to the number corresponding to the frequency information of the partial area among the plurality of image frames for each partial area, the frequency information being acquired in the frequency determination step.

(Appendix 18)

The object information extraction method described in appendix 17, wherein each partial area is a divided area that is an image area obtained by dividing each image frame, the image frame being acquired in the image acquisition step, at least one of the plurality of partial areas includes an individual area representing a predetermined object, and in the information extraction step, the computer extracts object information of the predetermined object from the individual area by executing image processing for image frames corresponding to the number corresponding to the frequency information of the at least one partial area among the plurality of image frames for the individual area in the at least one partial area, the frequency information being acquired in the frequency determination step.

(Appendix 19)

The object information extraction method described in appendix 17, wherein the partial area represents a predetermined object, wherein in the frequency determination step, the computer acquires the motion amount of a plurality of predetermined objects represented by the plurality of partial areas, wherein in the frequency determination step, the computer determines each frequency index indicating a high index depending on a size of the motion amount, wherein in the frequency determination step, the computer determines a plurality of pieces of frequency information regarding the plurality of predetermined objects based on each frequency index, and wherein in the information extraction step, the computer extracts each object information of the predetermined object by executing image processing for image frames corresponding to the number corresponding to the frequency information of the predetermined object among the plurality of image frames for each predetermined object represented for each partial area, the frequency information being acquired in the frequency determination step.

(Appendix 20)

The object information extraction method described in appendix 19, wherein in the frequency determination step, the computer further determines a plurality of frequency indexes for a plurality of divided areas, the divided areas being image areas obtained by dividing each image frame, the image frame being acquired in the image acquisition step, wherein in the frequency determination step, the computer determines a plurality of pieces of frequency information for a plurality of predetermined objects using the frequency index, based on the motion amount and the frequency index for the divided area including the individual area representing the predetermined object.

(Appendix 21)

The object information extraction method described in appendix 19 or 20, wherein in the frequency determination step, the computer acquires information of a size or a direction for each predetermined object, wherein in the frequency determination step, the computer determines each frequency index based on the information of a size or a direction, wherein in the frequency determination step, the computer extracts object information of each predetermined object using each frequency index based on the information of a size or a direction.

(Appendix 22)

The object information extraction method described in any one of notes 19 to 21, further including:

an object detection step of detecting, by the computer, the predetermined object from the plurality of image frames acquired in the image acquisition step; and a motion amount detection step of detecting, by the computer, an amount of motion of the predetermined object detected in the object detection step, wherein the frequency determination step includes acquiring the motion amount of the predetermined object detected in the motion amount detection step.

(Appendix 23)

The object information extraction method described in appendix 20, wherein in the frequency determination step, when the plurality of predetermined objects are included in the divided area, the computer calculates a frequency index based on a common motion amount for the plurality of predetermined objects, the computer using a value obtained by performing statistical processing on the motion amount of the plurality of predetermined objects as the motion amount of the plurality of predetermined objects.

(Appendix 24)

The object information extraction method described in appendix 18 or 20, wherein in the frequency determination step, the computer generates frequency information for each divided area based on an imaging range of the image.

The application claims priority of Japanese Patent Application No. 2012-209111 filed on Sep. 24, 2012, the content of which is incorporated herein by reference in its entirety.

What is claimed is:

1. An object information extraction apparatus comprising:

a processor; and
a non-transitory computer-readable data storage medium storing computer-executable code that the processor executes to:
acquire a plurality of image frames;
acquire frequency information including a frequency of execution of image processing, the frequency included in the frequency information being different for each of a plurality of partial areas included in the image frames, the frequency included in the frequency information indicating how many image frames among a predetermined numbers of the image frames are to be under execution of the image processing; and
execute image processing for the plurality of the partial areas of the image frames at the frequency indicated by the frequency information, and extracts object information from at least one of the plurality of partial areas,
wherein as object motion increases, the frequency at which the image processing is executed is increased.

2. The object information extraction apparatus according to claim 1,
wherein each partial area is a divided area that is an image area obtained by dividing each image frame that is acquired,
at least one of the plurality of partial areas includes an individual area representing a predetermined object, and
the processor is to extract object information of the predetermined object from the individual area by executing image processing for image frames corresponding to the number corresponding to the acquired frequency information of the at least one partial area among the plurality of image frames for the individual area in the at least one partial area.

3. The object information extraction apparatus according to claim 1,
wherein the partial area represents a predetermined object,
wherein the processor is to acquire the motion amount of a plurality of predetermined objects represented by the plurality of partial areas,
wherein the processor is to determine each frequency index indicating a high index depending on a size of the motion amount,
wherein the processor is to determine a plurality of pieces of frequency information regarding the plurality of predetermined objects based on each frequency index, and
wherein the processor is to extract each object information of the predetermined object by executing image processing for image frames corresponding to the number corresponding to the acquired frequency information of the predetermined object among the plurality of image frames for each predetermined object represented for each partial area.

4. The object information extraction apparatus according to claim 3,
wherein the processor is to determine a plurality of frequency indexes for a plurality of divided areas, the divided areas being image areas obtained by dividing each image frame that is acquired,
wherein the processor is to determine a plurality of pieces of frequency information for a plurality of predetermined objects using the frequency index, based on the motion amount and the frequency index for the divided area including the individual area representing the predetermined object.

5. The object information extraction apparatus according to claim 3,
wherein the processor is to acquire information of a size or a direction for each predetermined object
wherein the processor is to acquire each frequency index based on the information of a size or a direction, and
wherein the processor is to extract information of each predetermined object using each frequency index based on the information of a size or a direction.

6. The object information extraction apparatus according to claim 3, wherein the processor further executes the computer-executable code to:
detect the predetermined object from the plurality of image frames that have been acquired; and
detect an amount of motion of the predetermined object that has been detected,
wherein the processor is to acquire the motion amount of the predetermined object that has been detected.

7. The object information extraction apparatus according to claim 4,
wherein when the plurality of predetermined objects are included in the divided area, the processor calculates a frequency index based on a common motion amount for the plurality of predetermined objects, using a value obtained by performing statistical processing on the motion amount of the plurality of predetermined objects as the motion amount of the plurality of predetermined objects.

8. The object information extraction apparatus according to claim 2,
wherein the processor generates frequency information for each divided area based on an imaging range of the image.

9. A non-transitory computer-readable storage medium comprising an object information extraction program for causing a computer to function as an object information extraction apparatus, the program causing the computer to perform:
an image acquisition function of acquiring a plurality of image frames;
a frequency determination function of acquiring frequency information including a frequency of execution of image processing, the frequency included in the frequency information being different for each of a plurality of partial areas included in the image frames, the frequency included in the frequency information indicating how many image frames among a predetermined numbers of the image frames are to be under execution of the image processing; and
an information extraction function of executing image processing for the plurality of the partial areas of the image frames at the frequency indicated by the frequency information, and extracting object information from at least one of the plurality of partial areas,
wherein as object motion increases, the frequency at which the image processing is executed is increased.

10. An object information extraction method for causing a computer to function as an object information extraction apparatus, the method comprising:
an image acquisition step of acquiring, by the computer, a plurality of image frames;
a frequency determination step of acquiring, by the computer, frequency information including a frequency of execution of image processing, the frequency included in the frequency information being different for each of a plurality of partial areas included in the image frames, the frequency included in the frequency information indicating how many image frames among a predetermined numbers of the image frames are to be under execution of the image processing; and an information extraction step executing image processing for the plurality of the partial areas of the image frames at the frequency indicated by the frequency information, and of extracting, by the computer, object information from at least one of the plurality of partial areas, wherein as object motion increases, the frequency at which the image processing is executed is increased.

\* \* \* \* \*